United States Patent [19]

McCabe

[11] Patent Number: 4,474,167

[45] Date of Patent: Oct. 2, 1984

[54] LATCH FOR A BUTTERFLY DAMPER

[76] Inventor: Francis J. McCabe, 239 Hastings Ct., Doylestown, Pa. 18901

[21] Appl. No.: 351,241

[22] Filed: Feb. 22, 1982

Related U.S. Application Data

[63] Continuation-in-part of Ser. No. 117,125, Jan. 31, 1980, abandoned, which is a continuation-in-part of Ser. No. 947,104, Sep. 29, 1978, Pat. No. 4,241,748, which is a continuation-in-part of Ser. No. 792,525, May 2, 1977, Pat. No. 4,146,048.

[51] Int. Cl.³ ............................................. F23N 3/04
[52] U.S. Cl. .................................. 126/287.5; 16/48.5; 49/7; 137/75; 160/5; 292/246; 292/DIG. 60
[58] Field of Search ............... 126/287.5; 160/5, 1; 49/7, 8; 16/48.5; 137/75, 77; 292/246, DIG. 60

[56] References Cited

U.S. PATENT DOCUMENTS

| | | | |
|---|---|---|---|
| 1,028,044 | 5/1912 | Mack | 137/465 |
| 2,148,530 | 2/1939 | Burke | 126/287.5 X |
| 2,493,736 | 1/1950 | Brown | 251/11 |
| 2,765,802 | 10/1956 | Rowell | 137/75 |
| 3,009,473 | 11/1961 | Hennen | 251/212 X |
| 3,076,469 | 2/1953 | Averill | 126/287.5 |
| 3,273,632 | 9/1966 | McCabe | 160/1 |
| 3,327,764 | 6/1967 | McCabe | 160/5 |
| 3,337,991 | 8/1967 | Adams | 98/86 X |
| 3,401,734 | 9/1968 | McCabe | 137/75 UX |
| 3,467,163 | 9/1969 | Vassaux | 160/1 |
| 3,495,606 | 2/1970 | Phillips | 137/75 |
| 3,521,692 | 7/1970 | Johnson | 160/84 R |
| 3,543,439 | 12/1970 | Pantland | 49/7 |
| 3,720,153 | 3/1973 | Jardinier et al. | 98/86 |
| 3,725,972 | 4/1973 | McCabe | 16/48.5 |
| 3,727,663 | 4/1973 | McCabe | 160/84 R |
| 3,734,114 | 5/1973 | Phillips | 160/1 |
| 3,796,248 | 3/1974 | McCabe | 160/1 |
| 3,814,165 | 6/1974 | McCabe | 160/207 |
| 3,866,656 | 2/1975 | McCabe | 160/84 |
| 3,866,657 | 2/1975 | McCabe | 160/181 |
| 3,889,314 | 6/1975 | McCabe | 16/48.5 |
| 3,899,156 | 8/1975 | McCabe | 251/303 |
| 3,921,900 | 11/1975 | Cole | 137/601 X |
| 4,080,978 | 3/1978 | McCabe | 137/601 X |
| 4,081,173 | 3/1978 | McCabe | 137/601 X |
| 4,146,048 | 3/1979 | McCabe | 137/75 |

FOREIGN PATENT DOCUMENTS

| | | | |
|---|---|---|---|
| 2307228 | 2/1939 | France | 137/75 |
| 2140805 | 1/1973 | France | 137/75 |
| 2316513 | 3/1977 | France | 137/75 |
| 183592 | 5/1963 | Sweden | 251/212 |

OTHER PUBLICATIONS

A Single Page of Trade Literature for TITUS Butterfly Dampers.
A Single Page of Trade Literature of ETL for a Pivot Blade Ceiling Radiation Damper.

*Primary Examiner*—Samuel Scott
*Assistant Examiner*—Allen J. Flanigan

[57] ABSTRACT

An air/smoke/fire damper including a frame and a pair of damper blades pivoted for rotation within the frame between an open and a closed position, and comprising a heat responsive latch including mounting straps associated with each of the damper blades; a fusible link engaging one of the mounting straps; and a hook pivotally associated with the other mounting strap and extending over the edges of the damper blades and into engagement with the fusible link. Also, a locking mechanism for restraining the blades in the closed position upon release of the heat responsive latch, and a retaining lug for preventing blade buckling in the closed position.

28 Claims, 12 Drawing Figures

LATCH FOR A BUTTERFLY DAMPER

CROSS REFERENCE TO RELATED APPLICATIONS

This application is a continuation-in-part of my prior copending United States patent application Ser. No. 117,125, filed Jan. 31, 1980, entitled, BUTTERFLY SMOKE/FIRE/PRESSURIZED DAMPERS WITH LOCKING AND REINFORCING LUGS, and now abandoned; which is in turn a continuation-in-part of my prior copending United States patent application Ser. No. 947,104, filed Sept. 29, 1978, entitled, "BUTTERFLY SMOKE/FIRE DAMPER", now U.S. Pat. No. 4,241,748, dated Dec. 30, 1980; which is in turn a continuation-in-part of my prior copending United States patent application Ser. No. 792,525, filed May 2, 1977, entitled, "FIRE DAMPER AND METHOD OF FABRICATION", now U.S. Pat. No. 4,146,048, dated Mar. 27, 1979, which applications are each incorporated by reference as if fully set forth herein.

BACKGROUND OF THE INVENTION

This invention relates generally to the field of air/smoke/fire dampers, and in particular, to an improved latch for use with such dampers.

It is important that an air/smoke/fire control damper be capable of withstanding intense heat and/or air pressures which may impinge on either side of the damper for substantial periods of time, such as during a fire. Due to the extreme conditions to which such dampers are subjected, it is necessary to provide blade and frame constructions which reliably combine to form a tight, positive seal capable of effectively closing off the air duct, opening or plenum with which the damper is associated, to maintain a specified fire/smoke rating.

To meet this need, a number of folding blade fire dampers have been developed. Such devices generally utilize a plurality of rotating blades which are capable of forming a seal with any adjacent blades, as well as with the damper frame. However, this seal is often prone to leakage unless relatively precise alignments and tolerances are maintained. This problem is aggravated by the fact that a smoke and fire damper must be able to function effectively in a relatively dirty environment, often years after it has been installed. Moreover, using a multiplicity of separate blades has the disadvantage of imposing a greater resistance to air flow through the damper during normal operating conditions.

In an attempt to overcome these problems, rotating blade fire and smoke dampers of the prior art are often fabricated from extremely heavy materials which are not prone to easy bending or deformation in the presence of heat. Further such damper blades are generally mounted within the damper using distinct hinges or pivots which are separately provided for the purpose of aligning each of the blades for rotational movement, and to ensure proper inter-engagement of each blade with any adjacent blades to form a seal which will not open in the presence of heat or excessive pressure. As a result, such damper constructions are often cumbersome, and relatively complex, both in operation and manufacture. Moreover, such damper constructions generally present a significant resistance to air flow, often producing unacceptable losses.

Sometimes it is desirable to provide such dampers with springs which force the blades of the damper to their closed position. My previously issued U.S. Pat. No. 3,889,156 illustrates the use of a spring in this regard. However, such springs have generally not been used in the absence of a separate locking device which directly restrains the blades during the occurance of a fire, since the heat of the fire can often cause such springs to lose their strength, and thus their effectiveness.

In therefore remains desirable to develop a damper construction which operates effectively in the presence of a fire, overcoming the foregoing disadvantages, but which provides a streamlined open blade profile capable of decreasing air flow energy losses.

SUMMARY OF THE INVENTION

In the description which follows, a fire damper is disclosed for use in air ducts and the like. Generally the damper remains open, in a streamlined configuration, under normal operating conditions. However, in the event of a fire the damper is equipped to automatically snap shut and prevent the spread of fire through the duct work.

In accordance with the present invention, a novel damper latch is disclosed which ensures quick and reliable operation of the damper, in the event of a fire, through the interplay of several unique features. Positive closure is accomplished even though the fire damper may sit in a duct for an extended period of time without a fire occurring, despite the resulting accumulation of dirt and grease on the duct hinges and blades, etc.

In a preferred embodiment, two blades are pivotally engaged by a crossbar including two longitudinally extending hinge elements. The crossbar bridges the duct opening and is attached, at each end, either to the damper frame or flange, or directly to the duct walls if desired. In the open position, the blades are substantially parallel to one another and to the direction of air flow through the duct so that only the thin blade edges are encountered by the air flow, thus minimizing resistance to air flow through the duct.

To hold the blades together and in their open position, a heat sensitive latch is provided which includes a strap attached to the surface of one of the damper blades at one end and having a slotted portion at its other end; a hook associated with the slotted portion of the strap and capable of extending over the edges of the damper blades; and a fusible link extending between the hook and attachment means associated with the remaining damper blade. In use, the fusible link is weakened and severed by the heat of the fire, releasing the hook and permitting the damper blades to assume their closed position. Preferably, spring means are used to bias the blades toward their closed position. Although preferred, such spring biasing is not always needed. For example, the blades may be allowed to close under the influence of gravity if desired.

Various means can be employed to limit rotation of the blades once they have reached the closed position. For example, an inwardly depending flange can be attached to or made part of the damper frame. Alternatively, releasable spring clips can be mounted on, or adjacent to, the flange to hold the blades in the closed position. In either event, after the fire is over, the blades can then be reopened and reset to their normal operating position, for subsequent use.

It is desirable to prevent not only the spread of fire, but also to prevent the high temperatures which accompany a fire from being conducted through to the other side of the duct when the damper is closed. Accordingly, each damper/blade combination is configured to provide a solid, single plane barrier for maximum security against heat transfer by radiation and convection. In addition, as shown in my U.S. Pat. No. 4,146,048, insulation material can be placed over one or both surfaces of the blades without changing the basic configuration of the damper, and in most cases, without interfering with either the air flow through the duct or the action of the blades.

The latch mechanism of the present invention may be used in conjunction with a variety of different damper types including both single and double blade dampers; as well as round, square or rectangularly shaped dampers; with or without spring biased assistance. Accordingly, the simplified construction disclosed herein provides a method for easily fabricating and inexpensively producing dampers having an improved heat sensitive latch for operating the damper blades.

Using such dampers in conjunction with ducts having relatively large cross-sectional areas often requires the damper to have relatively large blades, which generally become less able to withstand the pressures developed within the duct as their size increases. Accordingly, additional precautions must be taken to prevent such blades from buckling during a fire. Previously, this had been done using sturdier, heavy gauge materials to form the blades. In accordance with the present invention, reinforcing locking devices are provided which contact the blades upon closure, and which serve to keep the blades closed as long as a heat stimulus remains. After the heat stimulus has passed, these reinforcing locking devices are adapted to either relax by themselves, or by an external force, to release the blades and permit the damper to be reopened.

Accordingly, it is a primary object of the present invention to provide an improved latch for pivoting blade air/smoke/fire dampers.

It is another object of the present invention to provide a damper having locking means which assure that the seal produced between the blades and the restraining flange of the damper is maintained while the blades are in the closed position.

It is another object of the present invention to provide a damper having locking reinforcement means associated with the damper blades and capable of preventing the damper blades from buckling.

It is another object of the present invention to provide a damper having locking reinforcement means which allow the use of low cost, lighter gauge materials in conjunction with larger size dampers.

These and other objects of my invention will become apparent from the following detailed description, taken in conjunction with the following illustrations.

BRIEF DESCRIPTION OF THE DRAWINGS

In the several views provided, like reference numerals denote similar structure.

DETAILED DESCRIPTION OF THE PREFERRED EMBODIMENTS

Although specific forms of the invention have been selected for illustration in the drawings and the following description is drawn in specific terms for the purpose of describing these forms of the invention, this description is not intended to limit the scope of the invention which is defined in the appended claims.

Figure 1:
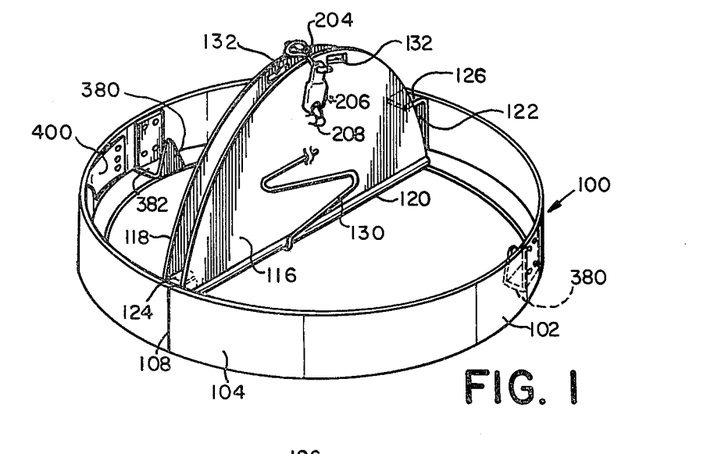
FIG. 1 is a perspective view of a preferred embodiment butterfly damper, also showing the latch mechanism which is used to maintain the blades in the open position during normal operating conditions, and the reinforcing locking devices which are used to hold the blades in the closed position during a fire.
Figure 2:
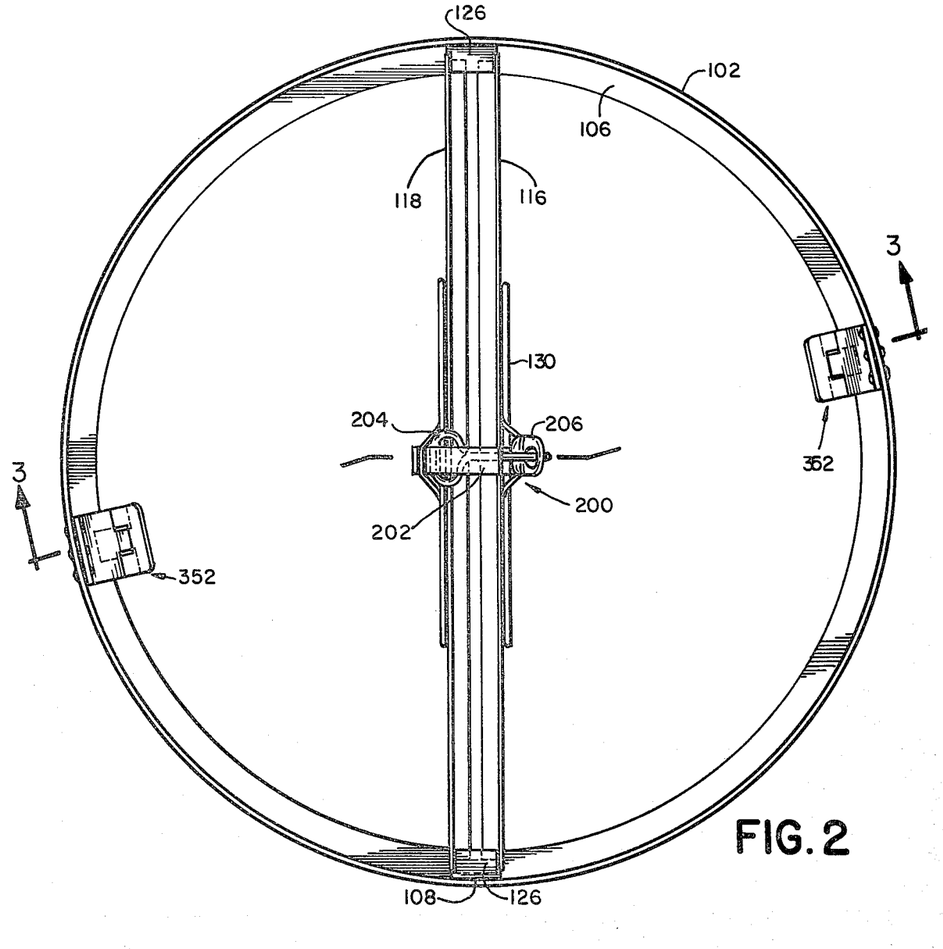
FIG. 2 is a top plan view of the butterfly damper of FIG. 1, also showing alternative embodiment blade reinforcing locking devices.
Figures 3, 4B, 7, 7A:
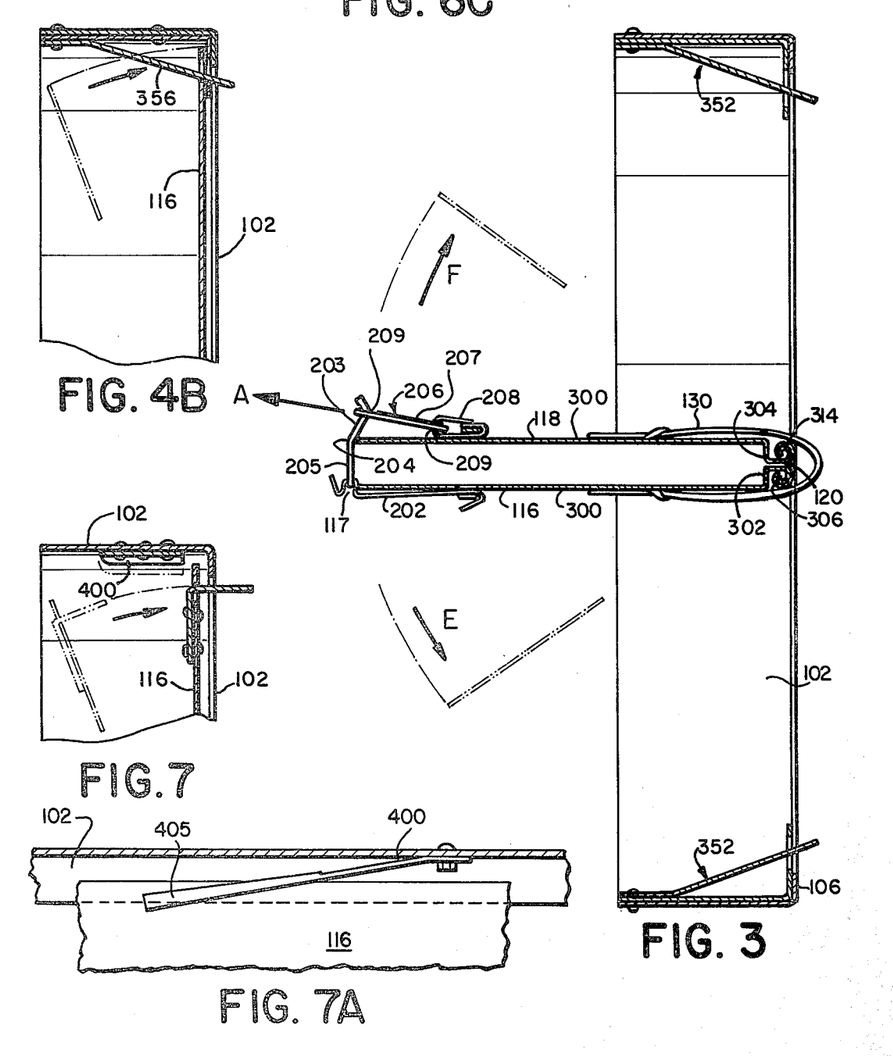
FIG. 3 is a cross-sectional view of the butterfly damper of FIG. 2, taken along line 3—3 in FIG. 2.
FIG. 4B is a cross-sectional view of the reed-type spring locking clip assembly of FIG. 4A.
FIG. 7 is a partial, cross-sectional view of the reinforcing locking device illustrated in FIG. 1.
FIG. 7A is a partial, cross-sectional view of the reinforcing locking device illustrated in FIG. 7 shown in its locking position.

Referring now to the drawings, FIGS. 1, 2 and 3 show a double bladed butterfly damper, designated generally as 100, which incorporates the latch mechanism 200 of the present invention. As will be described below, the latch means 200 may also be used with other damper constructions if desired.

As shown, the damper 100 is generally circular in cross-section and comprises a frame 102 having a wall 104 which terminates along an inwardly depending flange 106. To form the continuous frame 102, the wall 104 is attached together at the seam 108, using any of a variety of assembly methods. It is, of course, not necessary that the damper frame be circular in cross-section, it being fully understood that the damper frame 102 can be formed to fit any shaped duct, examples being those with square or rectangular cross-sections. Moreover, irrespective of the shape of the damper, a single or multi-bladed configuration may be used. The basic operational principles and structural improvements herein described apply equally to all of these configurations.

FIG. 3 illustrates the manner in which the blades 116, 118 (shown in the open position) are attached to the damper frame 102. Each blade 116, 118 comprises a planar section 300 which terminates at a transfer section 302. The transfer section 302 preferably is perpendicular to the planar section 300 and extends toward the opposite blade. The terminating end of the transfer section 302 is provided with a straight section 304 which is preferably substantially parallel to, but spaced away from, the planar section 300. Section 304 terminates in a hook shaped portion 306 which extends longitudinally along the length of each blade 116, 118 as shown.

During normal operating conditions, when there is no fire present, the planar, semicircular blades 116, 118 must remain locked in the open position. In this position, the blades are essentially parallel to and spaced apart from one another, or if preferred, the blade edges 119 can be pulled toward each other slightly so that the blade group forms a tear drop shape, minimizing resistance or blockage to the air flow through the duct. To achieve a similar result with single blade dampers, a thin, low profile blade can be tucked against the wall of the damper or duct.

To provide a means for pivoting the blades 116, 118 between the open and closed positions, the crossbar 120 is provided. As shown, the crossbar 120 is positioned on the inwardly depending flange 106 of the frame 102 so that it spans the diameter of the damper. The crossbar 120 is attached to the frame 102 using brackets 122 and 124 associated with the damper frame 102.

Brackets 122 and 124 serve an additional purpose. Attached to each bracket is an inwardly depending tab 126 which serves to contact the blades 116, 118 when they are folded upwardly and locked in the open position, thereby regulating their positioning. By restraining the degree of inward blade movement to slightly more than to 90°, the blades are maintained in a position which minimizes the restriction of air flowing within the duct.

The crossbar 120 comprises two longitudinally extending hook shaped hinge elements 314 which are separated by a connection portion 316. The hinge elements 314 are configured to matingly engage the hook shaped portions 306 of the blades 116, 118, providing a means for pivoting the blades about the crossbar 120, between the opened and closed positions.

To assist in closure of the blades, a serpentine closure spring 130 is preferably attached to and between the blades 116, 118. As illustrated in FIGS. 1 and 3, this attachment is preferably performed using a pair of indented, punched dimples 308 located on each of the blades, and the spring 130 is preferably independent of the cross bar 120 and hinge elements 306, 314. If preferred, other attachment means, springs or pivoting structures can be used, however, the present embodiment is preferred in view of its low cost and strength. Furthermore, for air control purposes, the blades can be motor driven to assume preset or programmed intermediate positions, if desired.

A latching mechanism, or linkage, generally designated as 200, is associated with the blades 116, 118 to provide a means for maintaining the blades in the open position during normal operating conditions, and for releasing the blades in the event that the temperatures of the air flow passing through the duct exceeds a predetermined value. In its preferred embodiment, the linkage 200 generally comprises a strap 202, a hook 204 and a fusible link 206.

The strap 202 is attached at one end to the outside surface of one of the blades, in this case the blade 116, and terminates in a slotted portion 117 adjacent the uppermost edge portion of the blade 116. The slotted portion 117 is formed by simply bending the strap 202, preferably so that it is essentially perpendicular to the surface of the blade 116.

The slot 117 serves to engage one end of a rotating swivel hook 204. As is best illustrated in FIG. 3, the hook 204 extends from the slot 117, over both blades 116, 118, and into engagement with one end of a fusible link 206. The remaining end of the fusible link 206 is attached to the remaining blade, in this case the blade 118, by a link mount strap 208. Under normal operating conditions, this combination cooperates to hold the blades 116, 118 in the open position.

As shown, the fusible link 206 generally includes a central body 207 having a hook 209 at each end. The central body is formed of a substance which breaks down at a preselected temperature, releasing any structure attached to and between the hooks 209; in the present example, the hooked end portion 203 of the hook 204 and the link mount strap 208. In this manner, when the link fusion temperature is reached, the link separates and the blades are allowed to close. Fusible links 206 come in a variety of different designs and can be adapted to separate over a wide range of temperatures.

The force needed to accomplish closure of the damper blades 116, 118 is important in assuring proper operation of the damper. Ideally, the spring force used to close the blades, once the link has broken, should be as little as possible to permit a relatively "soft" closure, having a minimum impact on the damper frame 102 and its associated structure. This consideration is particularly important when the damper 100 is to be used in a drop ceiling application, where a "hard" impact could dislodge ceiling tiles. Regulation of this impact depends largely upon the following consideration.

To place the blades 116, 118 in the open position, the blades 116, 118 are pivoted toward each other until the swivel hook 204 is capable of extending over both blades and into engagement with the fusible link 206. In so doing, the spring 130 is placed in tension. This tension serves to tighten the interconnection between the several components comprising the linkage 200, by forcing the upper edge of the blade 118 against the downwardly disposed portion 203 of the hook 204. This, in turn, firmly latches the hook 204 in position so that the link 206 cannot slip off the hook 204, and also assures effective link separation when the link fusion temperature is reached. I have also found that the speed of operation of the damper 100 generally depends upon the relative orientation between the hook 204 and the blades 116, 118, and is primarily a function of the position assumed by the hook 204 as a result of contact between the hook 204 and the blade 118.

Underwriters Laboratory, Inc., Standard UL 33, specifies that for the present type of damper release, the minimum force needed to break the link 206 and release the blades 116, 118 is one pound. This minimum standard must be exceeded so that, in the presence of sustained heat such as during a fire, damper operation will not be unduly delayed or prevented. I have found that to approach this value, the shank 205 should be substantially parallel to the plane defined by the damper frame 102, and that the downwardly disposed hook portion 203 should assume an angle in relation to the shank 205 so that the resultant force produced when the blade 118 bears against the hook 204 exceeds the established one pound minimum colinear force required to properly operate the link 206. This resultant force is diagramatically illustrated by arrow "A" in FIG. 3. Note also in FIG. 3 that the strap 202 is configured and attached to the blade 116 in a manner which assures firm contact between the blade 118 and the hook portion 203.

In operation, when a fire occurs, the link 206 softens until a point is reached where the forces produced are able to pull the link 206 apart and release the blades 116, 118, allowing the blades to move in the directions of the arrows "D" and "E" shown in FIG. 3. As previously described, the fusible link 206 can be selected from a number of readily available low melting point alloys and/or structures. In the embodiment shown herein, the fusible link 206 is a relatively simple structure formed of a fusible alloy. However, more complicated approaches can be used if preferred, one example being the device which is shown in my U.S. Pat. No. 3,889,314, entitled "HEAT ACTUATED LINK", or that shown in my U.S. Pat. No. 3,725,972, entitled "FIRE LINK AND METHOD OF ACTUATING THE SAME". Irrespective of the approach used, it is possible to adjust the temperature at which actuation of the linkage 200 will occur over a wide range. Generally, this range lies between 165° and 370° F., however, other values beyond this range may be selected for a particular application. When using the more advanced types of latching systems previously described, features such as remote electrical or pneumatic actuation can also be incorporated into the system. In so doing, considerable versatility is added to the damper, permitting such dampers to be adapted to operate in a wide variety of different applications.

In the closed position, the blades 116, 118 of the damper 100 form a single plane barrier which provides significant protection against the transfer of heat produced by a fire, either by radiation or convection. Additional protection can be attained by attaching insulation material (not shown) to the planar portions 300 of the blades, as shown in my U.S. Pat. No. 4,146,048. The transverse portions 302 of the blades 116, 118 provide sufficient space between the planar portions 300 of the blades to accomodate this insulation material without interfering with operation of the damper, or the flow of air through the duct. It is also possible to mount insulation on both sides of the damper blades if desired, to still further improve the heat insulating capabilities of the system.

Once the blades 116, 118 have moved to their closed position, it is desirable that they remain that way until the fire and associated high temperatures have ceased. To ensure that the blades stay locked in the closed position, and in accordance with the present invention, one or more reinforcing locking devices, or locking clips, may be used.

Figure 4A:
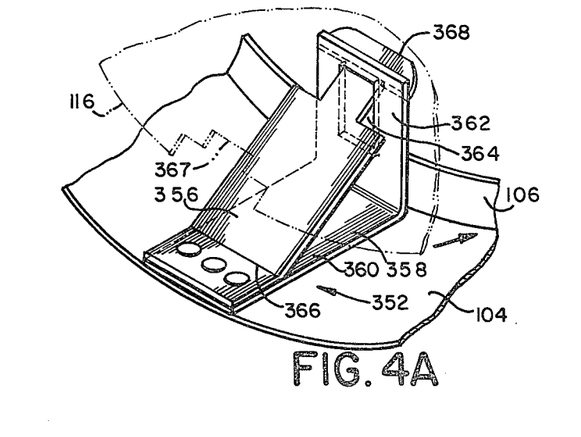
FIG. 4A is a partial, isometric view of the butterfly damper of FIG. 2, also showing a reed-type spring locking clip assembly for use with flangeless blades.

One such spring locking clip, generally identified as 352, is shown in FIGS. 4A and 4B and is primarily intended for use with round dampers having flangeless blades. Locking clip 352 generally comprises a shaped leaf spring element 356, preferably formed of stainless steel, and a right angle bracket 358. The element 356 is attached to the bracket 358, which is in turn mounted on the damper wall 104 so that the base 360 of the bracket 358 is coplanar with the wall 104 and aligned perpendicularly to the flange 106, so that the right angle portion 362 tangentially abuts the flange. One end of the element 356 is attached to the rear end of the base 360 by rivets, spot welds or other suitable attachment means. The other end 368 of the element 356 is shaped so that narrowed portions of the end 368 can engage, and slide within, a notch 364 provided in the right angle portion 362. Preferably, the bend 366 in the element 356 is such that the free end 368 of the clip 352 rests away from the lower edge of the notch 364, which is roughly adjacent to the inner edge of the flange 106.

As is best shown in FIG. 4A, the blade 116 (shown in phantom) has a companion slot 367 which is adapted to mate with the spring clip 352. Slot 367 includes a first, relatively narrow notch 369 and a second, wider notch 359. The wider notch 359 is slightly wider than the element 356, while the narrower notch 369 is slightly wider than the narrowed portion 368 of the element 356, but narrower than the remainder of the element 356.

In operation, when a fire occurs, the blades 116, 118 are released and swing closed as previously described. In so doing, the blades eventually contact the spring clip 352 along the element 356, the element 356 becoming engaged by the notch 359 of the blade 116. This depresses the element 356 which permits the blade 116 to contact the right angle portion 362. At this time, the element 356 is permitted to return to its original position, so that the narrowed portion 368 of the element 356 engages the notch 369. This locks the blade against the flange 106, maintaining a seal between the blade and the flange.

Figure 5:
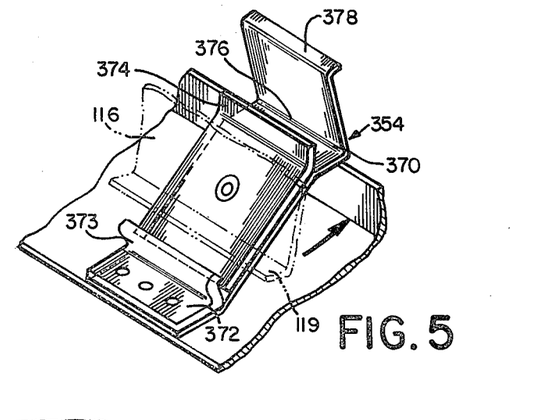
FIG. 5 is a partial, isometric view of the butterfly damper of FIG. 2, also showing an alternative embodiment reed-type spring locking clip assembly for use with flanged blades.

Another type of spring locking clip, generally identified as 354, is illustrated in FIG. 5, and is primarily intended for use with blades having inwardly depending, peripheral flanges 119, such as are often used with rectangular type dampers. Locking clip 354 generally comprises a three piece assembly including a shaped reed spring 370, a buttress clip 372 and a blade lock 374. The buttress clip 372 and reed spring 370 are attached to the damper wall 106 using rivets or other suitable attachment means in much the same manner as described in conjunction with the locking clip 352; that is, mounted on the damper wall 104, tangentially abutting the flange 106 at its forward end. The forward end 373 of the buttress clip 372 forms an elevated, serpentine restraint, preferably located at a right angle to the spring 370. As shown in FIG. 5, the blade lock 374 is mechanically attached to the spring 370 so that the rear end of the blade lock 374 fits downwardly, into the serpentine restraint 373, and so that the forward end of the blade lock 374 extends upwardly and away from the surface of the spring 370.

In operation, when a flanged blade (shown in phantom) of a damper is released, the blade will close in the same general manner as previously described. When the flanged blade comes into contact with the locking clip 354, the flange 119 of the damper blade will depress the spring 370, permitting the flange 119 to pass the blade lock 374. After the flange 119 clears the blade lock 374, the spring 370 will recover slightly, causing the flange 119 to be engaged by the open area 376 located between the spring 370 and the blade lock 374. As a result, further movement of the damper blade is prevented by those portions of locking clip 354 which bear against the flange 119, assuring an effective seal between the edge of the blade and the flange of the damper frame.

Once the fire, or other enabling condition, has subsided and the damper vicinity has cooled, it is often desirable to reopen the blades and to reset the damper for future use, using a new fusible link. To do so, it is first necessary to release the locking clips which secure the blades in their closed position. This can be done by pushing down on the release tabs 368, 378 which are associated with the forward edges of the locking clips 352 and 354, respectively. This, in turn, releases the blades 116, 118 so that the blades can be pushed toward their open position. At this point, the blades 116, 118 can be retained in the open position using a new fusible link 206, as described above.

When the size of the damper being used is relatively small, the locking clips previously described can be used by themselves to effectively lock the blades 116, 118 in the closed position. However, as the size of the damper increases (diameters or widths on the order of 20″), the relatively thin-gauge materials used to construct such dampers often tend to buckle under the stresses produced by heat. Therefore, additional reinforcements are often needed to assure that the forces produced will not be able to force the blades open, breaking the blade/flange seal. This may be accomplished using the retaining lugs illustrated in FIGS. 6A and 6B. As will become apparent, these retaining lugs can be used in several different ways.

Figure 6A:
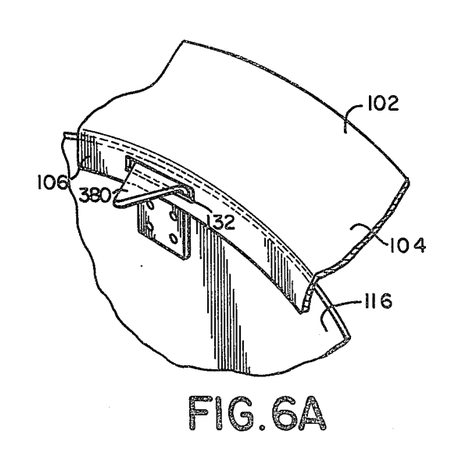
FIG. 6A is a partial, isometric view illustrating a blade retaining lug for use with flangeless blades.
Figure 6B:
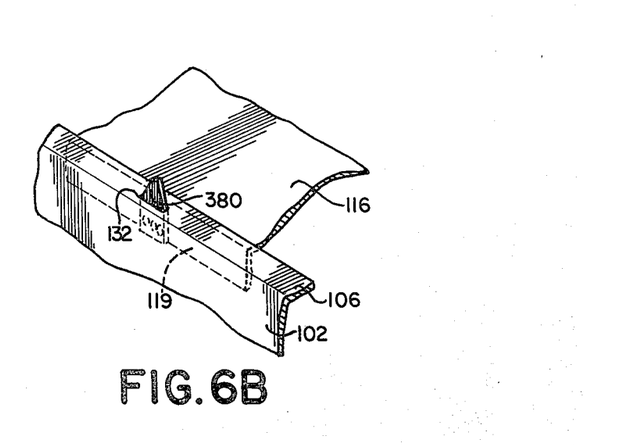
FIG. 6B is a partial, isometric view illustrating a blade retaining lug for use with flanged blades.
Figure 6C:
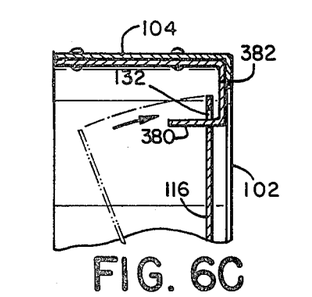
FIG. 6C is a partial, cross-sectional view of an alternative embodiment blade retaining lug attached to the damper wall.

As illustrated in FIGS. 6A, 6B and 6C, each retaining lug 380 comprises a mounting body 381 and a triangular projection 382. Referring to FIG. 6A, when used in conjunction with the locking clips 352, 354, the mounting body 381 of the retaining lug 380 is attached to the edge of each of the blades 116, 118 so that the projection 382 is oriented substantially at a right angle to the blades 116, 118, and so that when the blades 116, 118 close, the projection 382 will fit snugly into a slot 132 provided in the flange 106 of the damper. As shown in FIG. 6B, the retaining lug 380 can also be mounted on the flange 119 of a flanged damper blade to achieve the same result. As shown in FIG. 6C, the retaining lug 380 can also be attached to the frame 102 of the damper 100, for engagement by a slot 132 provided in each of the damper blades.

It may be seen that such structures provide considerable resistance to potential buckling. For example, engagement between the projection 382 and the slot 132 serves to prevent tortional forces applied against the damper blades 116, 118 from pulling the blades 116, 118 out from the locking clips 352, 354. The configuration of the hinges 306 of the damper blades 116, 118 tends to strengthen the blades along their diametric length, providing further tortional resistance. Moreover, a series of locking clips may be placed around the circumference of each blade, providing additional strength if desired. These factors combine to provide considerable resistance to unwanted movement of the blades once closed and locked in place.

FIG. 7 (and FIG. 1) illustrates an alternative embodiment locking clip, designated generally as 400, which is capable of operating in response to the ambient temperature in the vicinity of the damper 100. Such locking clips 400 generally comprise a leaf spring which is attached (e.g., riveted or welded) to the side wall 104 of damper frame 102, and which is formed of a bimetallic material. Such locking clips 400 may be used in conjunction with either unflanged or flanged blades. In use, each bimetallic leaf spring is secured to the side wall 104 of the damper frame 102 so that it normally lies sufficiently close to the side wall 104 to permit the damper blades to clear each locking clip 400 as they close. To assure that the damper blades 116, 118 clear the locking clip 400, the leading outer edge 405 is preferably notched or curved, to assist in depression of the locking clip 400 by the edge of the damper blade. In operation, when heated, the locking clips 400 expand outwardly (as shown in FIG. 7A) and into the path of the blades 116, 118 so that the blades can no longer clear the locking clips 400, locking the blades in position. The use of bimetallic locking clips provides an added advantage in that after the assembly cools, the locking clips 400 automatically retract, releasing the blades for subsequent use.

The locking clip 400 is therefore well suited for use in conjunction with both motorized and manually operated installations, and even serves to facilitate the installation of such damper assemblies. However, in many applications it is also possible to utilize a locking clip 400 formed of a resilient material, such as spring steel, to provide similar results. In such cases, it is preferred that the exposed edge of the locking clip 400 be provided with a notch or chamfer to assist the blade in passing the locking clip 400 as the blade assumes its locked, closed position. Release of a locked blade is easily accomplished by depressing the free end of the locking clip 400.

Figure 8:
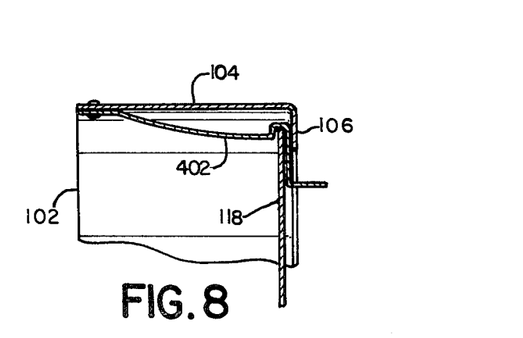
FIG. 8 is a partial, cross-sectional view of a damper having a resettable reinforcing locking device.

FIG. 8 illustrates an alternative embodiment locking clip 402 which is easily resettable and which is inexpensive to manufacture. Such locking clips 402 generally comprise a shaped band formed of a resilient material such as spring steel, one end of which is attached to the frame 102 of the damper 100, and the other end of which is provided with a locking detent 403. In use, as the blade closes, the locking clip 402 is contacted and depressed by the blade edge, until the detent 403 engages the blade edge, locking the blade in the closed position. An external release 404 is provided to assist in resetting the blades of the damper for subsequent use.

It will be understood that various changes in the details, materials and arrangements of parts which have been described and illustrated in order to explain the nature of this invention may be made by those skilled in the art within the principle and scope of the invention as expressed in the following claims.

What is claimed is:

1. A damper comprising:
    (a) a frame;
    (b) a pair of blades supported within the frame and adapted for movement between an open and a closed position; and
    (c) heat responsive latching means for restraining the blades in the open position, and for releasing the blades when the ambient temperature around the latching means reaches a preselected value, wherein the latching means comprises:
        (i) mounting means operatively associated with an outer surface of each of the blades;
        (ii) fusible link means, a first end of which is attached to the mounting means associated with one of the blades and adapted to separate when the preselected ambient temperature is reached; and
        (iii) linkage means comprising mounting strap means and hook means, one end of said mounting strap means being attached to the mounting means associated with the other of the blades, and the other end of which includes a slot for engaging said hook means, the hook means being disposed to extend over edges of the blades for attachment to a second end of the fusible link means so that the blades are restrained in the open position until the preselected ambient temperature is reached.

2. The damper of claim 1 wherein the hook means comprises a shank portion and an end portion capable of engaging the second end of the fusible link means.

3. The damper of claim 2 wherein the shank portion is disposed approximately parallel to a plane defined by the frame of the damper.

4. The damper of claim 2 wherein the end portion of the hook means contacts one of the blades of the damper.

5. The damper of claim 4 wherein the end portion forms an angle with the shank portion which develops a resultant vector force between the blade of the damper and the end portion of the hook means which is not less than the colinear force needed to cause separation of the fusible link means.

6. The damper of claim 5 wherein the colinear force needed to cause separation of the fusible link means is at least one pound.

7. The damper of claim 1 further comprising biasing means associated with the blades of the damper for urging the blades toward the closed position.

8. The damper of claim 7 wherein the biasing means is a spring attached to and disposed about the blades of the damper.

9. The damper of claim 8 wherein the spring is structurally independent of means associated with the damper for supporting the blades within the damper frame.

10. The damper of claim 8 wherein the spring has a serpentine configuration.

11. The damper of claim 1 further comprising means for positioning the blades of the damper in the open position.

12. The damper of claim 11 wherein the positioning means comprises a tab associated with the frame of the damper and located between surfaces of the blades when restrained in the open position.

13. The damper of claim 1 wherein the mounting strap is substantially parallel to the outer surface of said other damper blade, and wherein the slot of the mounting strap is substantially coincident with the edge of said other damper blade.

14. A damper comprising:
(a) a frame;
(b) at least one blade supported within the frame and adapted for movement between an open and a closed position;
(c) latching means for restraining the blade in the open position, and for releasing the blade when the ambient temperature around the latching means reaches a preselected value; and
(d) locking means for maintaining the blade in the closed position after the blade is released by the latching means, wherein the locking means comprises a resilient spring element, one end of which is attached to the damper frame, and the other end of which extends outwardly from the damper frame and into the path of movement of a closing blade, and wherein the resilient spring element includes a leading edge, the terminating end of which is notched or chamfered to facilitate movement of the blade.

15. The damper of claim 14 wherein the locking means is resettable.

16. The damper of claim 14 wherein the locking means and the damper blade and frame combine to form a solid, single plane barrier against heat transfer by radiation and convection.

17. The damper of claim 14 wherein the locking means further comprises means for releasing the locking means, and the damper blade restrained therein.

18. The damper of claim 14 further comprising means for radially restraining, and thereby preventing buckling of, the damper blade when in the closed position.

19. The damper of claim 18 wherein the restraining means comprises a retaining lug including a body attached to the damper frame, and a projection extending outwardly from the body and capable of engaging an aperture in the blade.

20. The damper of claim 18 wherein the restraining means comprises a retaining lug including a body attached to the blade, and a projection extending outwardly from the body and capable of engaging an aperture in the damper frame.

21. A damper comprising:
(a) a frame;
(b) a pair of blades supported within the frame and adapted for movement between an open and a closed position; and
(c) heat responsive latching means for restraining the blades in the open position, and for releasing the blades when the ambient temperature around the latching means reaches a preselected value, wherein the latching means comprises:
 (i) mounting means operatively associated with a surface of each of the blades;
 (ii) fusible link means, a first end of which is attached to the mounting means associated with one of the blades, adapted to separate when the preselected ambient temperature is reached; and
 (iii) linkage means pivotally associated with respect to the mounting means associated with the other of the blades and including hook means having a shank portion disposed to extend over edges of the blades and an end portion adapted for attachment to a second end of the fusible link means so that the blades are restrained in the open position until the preselected ambient temperature is reached;
 (iv) wherein the end portion of the hook means contacts one of the blades of the damper, and wherein the end portion forms an angle with the shank portion which develops a resultant vector force between the blade of the damper and the end portion of the hook means which is not less than the colinear force needed to cause separation of the fusible link means.

22. The damper of claim 21 wherein the linkage means further comprises a mounting strap, one end of which is attached to the mounting means of said other damper blade, and the other end of which includes a slot for engaging said hook means, the hook means being capable of engaging the second end of the fusible link means.

23. The damper of claim 22 wherein the mounting strap is substantially parallel to the outer surface of said other damper blade, and wherein the slot of the mounting strap is substantially coincident with the edge of said other damper blade.

24. A damper comprising:
(a) a frame;
(b) at least one blade supported within the frame and adapted for movement between an open and a closed position;
(c) latching means for restraining the blade in the open position, and for releasing the blade when the ambient temperature around the latching means reaches a preselected value;
(d) locking means for maintaining the blade in the closed position after the blade is released by the latching means; and (e) restraining means adapted to prevent the edge of the damper blade from being forced away from the frame in a radial direction, thereby preventing buckling of said blade.

25. The damper of claim 24 wherein the restraining means comprises a retaining lug including a body attached to the damper frame, and a projection extending outwardly from the body and capable of engaging an aperture in the blade.

26. The damper of claim 24 wherein the restraining means comprises a retaining lug including a body attached to the blade, and a projection extending outwardly from the body and capable of engaging an aperture in the damper frame.

27. The damper of claim 24 wherein the locking means comprises a resilient spring element, one end of which is attached to the damper frame, and the other end of which extends outwardly from the damper frame and into the path of movement of a closing blade.

28. The damper of claim 27 wherein the resilient spring element includes a leading edge, and wherein the terminating end of the leading edge is notched or chamfered to facilitate movement of the blade.

* * * * *